(12) United States Patent
Smith

(10) Patent No.: US 8,731,864 B2
(45) Date of Patent: *May 20, 2014

(54) SYSTEM AND METHOD OF SENSOR INSTALLATION VALIDATION

(75) Inventor: Richard Alan Smith, El Dorado Hills, CA (US)

(73) Assignee: Honeywell International Inc., Morristown, NJ (US)

( * ) Notice: Subject to any disclaimer, the term of this patent is extended or adjusted under 35 U.S.C. 154(b) by 302 days.

This patent is subject to a terminal disclaimer.

(21) Appl. No.: 13/105,022

(22) Filed: May 11, 2011

(65) Prior Publication Data

US 2012/0290247 A1 Nov. 15, 2012

(51) Int. Cl.
*G01D 3/036* (2006.01)
*G01B 13/00* (2006.01)
*G01B 13/04* (2006.01)

(52) U.S. Cl.
CPC ............... *G01B 13/00* (2013.01); *G01B 13/04* (2013.01)
USPC .......................................... 702/127

(58) Field of Classification Search
CPC ....... G08B 13/04; G08B 13/00; G08B 13/1436
USPC .......................................... 702/127, 150, 153
See application file for complete search history.

(56) References Cited

U.S. PATENT DOCUMENTS

| | | | |
|---|---|---|---|
| 5,414,409 A * | 5/1995 | Voosen et al. ............. | 340/541 |
| 5,508,511 A * | 4/1996 | Zur et al. .............. | 250/222.1 |
| 5,543,783 A * | 8/1996 | Clark et al. ............. | 340/550 |
| 5,691,699 A * | 11/1997 | Vane et al. ............. | 340/578 |
| 5,900,806 A * | 5/1999 | Issa et al. ............. | 340/426.25 |
| 6,236,313 B1 * | 5/2001 | Eskildsen et al. ......... | 340/550 |
| 2004/0215750 A1 * | 10/2004 | Stilp ........................ | 709/220 |
| 2005/0159911 A1 * | 7/2005 | Funk et al. ............. | 702/104 |
| 2006/0176167 A1 * | 8/2006 | Dohrmann ............. | 340/506 |
| 2008/0310254 A1 * | 12/2008 | Piel et al. ............. | 367/13 |

* cited by examiner

*Primary Examiner* — Mischita Henson
(74) *Attorney, Agent, or Firm* — Husch Blackwell LLP

(57) ABSTRACT

A glassbreak detector or motion detector includes circuitry responsive to an installation process. Data concerning the installation process can be automatically stored in non-volatile memory. The stored data can be retrieved as part of an after-installation review.

15 Claims, 2 Drawing Sheets

SYSTEM AND METHOD OF SENSOR INSTALLATION VALIDATION

FIELD

The application pertains to ambient condition detectors, such as glassbreak detectors or motion sensors. More particularly, the application pertains to such units which include stored information relating to the unit installation process.

BACKGROUND

Glassbreak detectors, and motion sensors, sometimes have problems with false alarms and/or detection which can be attributed to incorrect or incomplete installation procedures. Such units each usually include specific installation recommendations and/or requirements that define what steps the installer should perform to validate that the installation will result in optimal performance (i.e., range and sensitivity). With known units, when there is a reported detection issue, or false alarm, and a unit is returned for evaluation, only the "health" (i.e., is the unit in spec) can be determined. It has been is impossible to determine how (or if) the unit installation was properly performed at the time of installation, and if the recommended steps were performed.

DETAILED DESCRIPTION

Figure 1:
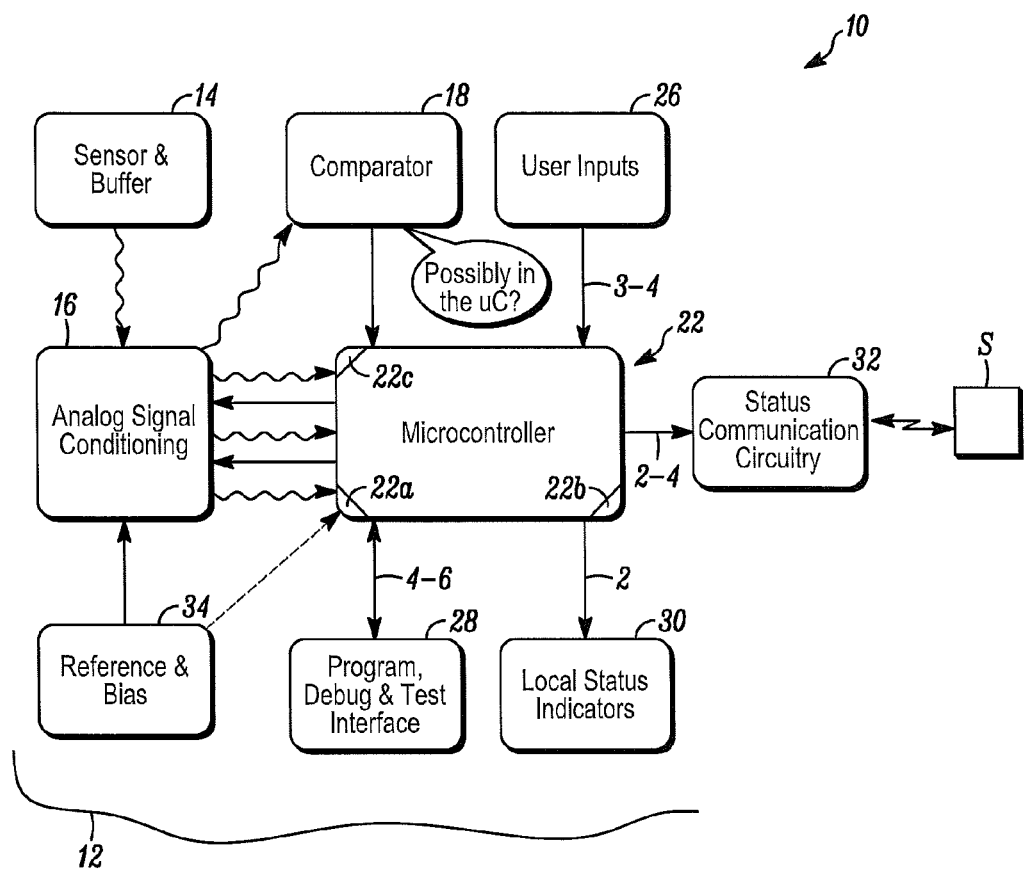
FIG. 1 is a block diagram of a detector which can store information relating to its installation.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

Dedicated non-volatile memory within the unit's circuitry can be used to store data pertinent to the unit's setup and validation steps performed at the time of installation. The data can then be retrieved if the unit is returned due to a performance problem. On site retrieval is also possible. Retrieval of the set-up data will enable a determination to be made as to the unit's proper or improper installation. Additionally the unit can report that status locally.

Non-volatile memory can be provided for storing pertinent installation set-up parameters. When the unit is powered up it checks to see if an installation flag data bit has been set. The installation flag bit can be set when the unit is first put into test mode. If the unit was never put into test mode, and it is returned for a performance issue it can be determined that the installer failed to follow the installation instructions with regards to properly range testing the unit. If the installation flag is set then the installation verification parameters can be retrieved from memory to determine if the setup steps where performed properly.

FIG. 1 is a block diagram of an embodiment of an environmental condition detector 10 in accordance herewith. Detector 10 has a housing 12 which carries a plurality of electronic components.

Detector 10 includes one or more environmental sensors 14, for example an acoustic sensor, such as a microphone, or a motion sensor such as an ultrasonic, microwave, or passive infrared sensor, without limitation. Buffered outputs from the sensors 14 can be coupled to analog signal conditioning circuitry 16

Conditioned analog, or digital, outputs from circuits 16 can be coupled to comparator circuits 18, and/or to control circuits 22 which might include the comparator circuits 18. Control circuits 22 could be implemented, at least in part, with a programmable processor 22a and pre-stored control programs 22b stored on non-volatile storage circuits 22c.

Control circuits 22 are also coupled to user input circuits 26 provided to enable a user to select installation parameters or conditions. A program, debug and test interface 28, coupled to control circuits 22, facilitates initial programming, debugging and testing of the detector 10. Indicators 30, or interface 28 can be used after installation to determine if data stored in the non-volatile circuits 22c indicates that detector 10 had previously been correctly installed.

Local status indicators 30, for example, audible or visual indicators such as audio output devices, LEDs, liquid crystal displays or the like, are coupled to circuits 22 and activated thereby to provide local status information. Status communication circuitry 32, coupled to control circuits 22, provides wired or wireless communication with a displaced regional monitoring system S as would be understood by those of skill in the art.

Figure 2:
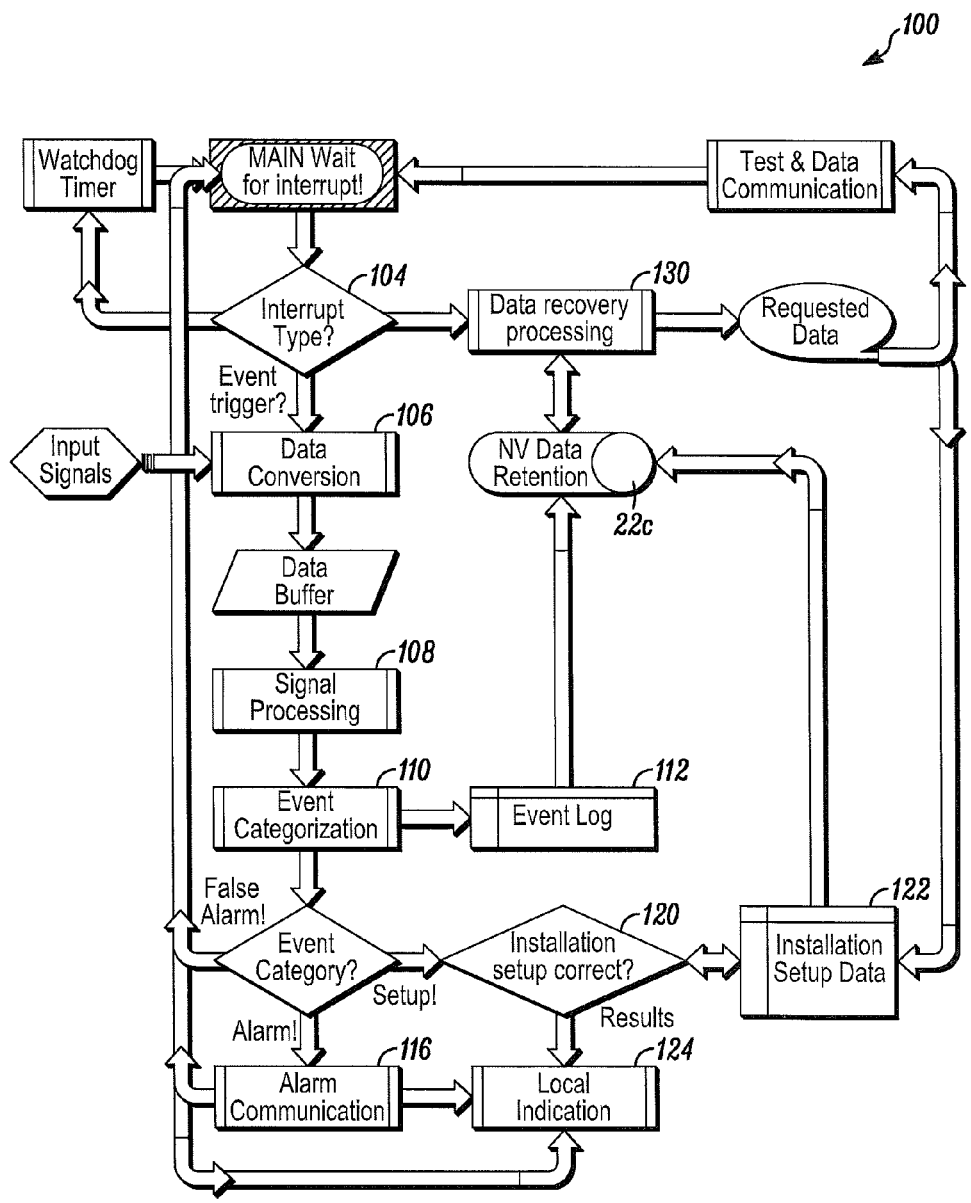
FIG. 2 is a flow diagram illustrating one form of operation of a detector as in FIG. 1.

FIG. 2 illustrates exemplary aspects of processing 100 at the detector 10. In response to detecting an event-indicating interrupt, as at 104, the control circuits 22 can acquire and convert, as at 106, one or more input signal values, from sensor 14. Those signals can be processed, as at 108, and categorized as to type of event, as a 110.

Events can be logged, as at 112, and stored in non-volatile memory 22c for after-installation review. An alarm event can generate an alarm communication, as at 116, either locally, via output devices 30, or via communications interface 32.

A detected set-up event can be evaluated to determine if installation had been carried out as expected, as at 120. Installation setup data can be stored in, loaded into, memory 22c, as at 122. A local indication thereof can be provided, as at 124 via output device(s) 30.

Where data recovery is requested, as at 130, either or both of installation and setup data, along with logged event information can be provided from the memory 22c and output via the local interface 28, or communications interface 32, and/or via local status indicators 30. The pre-stored setup, or installation, data makes possible after-installation reviews to evaluate the correctness of the installation process. Where a detector, such as 10, has failed to perform, such pre-stored information may be the only indicia as to the condition of the unit when the installation was completed. Advantageously, the installation related data can be detected and stored in real-time for later retrieval.

It will be understood that other types of sensors including position, thermal, smoke, infra-red, smoke gas or flame sensors all come within the spirit hereof. The specific details of a selected type of sensor are not limitations hereof.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be

The invention claimed is:

1. A detector comprising:
   a housing;
   an environmental condition sensor carried by the housing; and
   control circuits coupled to the environmental condition sensor;
   a program, debug and test interface coupled to the control circuits; and
   non-volatile memory, where the control circuits acquire input signals from the environmental condition sensor and store installation information pertinent to the detector's setup and validation steps performed at a time of installation of the detector including installation verification parameters related at least to range testing of the environmental condition sensor, the installation information is loaded into storage circuits of the non-volatile memory coupled to the control circuits, wherein when the detector is powered up, it checks to see if an installation flag data bit is set, where the installation flag data bit is set when the detector is first put into test mode and wherein the installation information is detected and stored in real time for later retrieval through the program debug and test interface.

2. A detector as in claim 1 which includes an access port, coupled to the storage circuits through which the loaded installation information is retrieved.

3. A detector as in claim 2 which includes at least one local output device and where the device can be activated to indicate installation status.

4. A detector as in claim 1 where, responsive to a predetermined event, the control circuits acquire one or more input signal values from the environmental condition sensor.

5. A detector as in claim 4 where the predetermined event includes at least one of a valid alarm, a false alarm, and a setup.

6. A detector as in claim 1 where at least one of alarm information and setup information are stored in the storage circuits coupled to the control circuits.

7. A detector as in claim 6 which includes access circuitry to retrieve at least one of the stored alarm information and the stored setup information.

8. A detector as in claim 1 which includes access circuitry to retrieve the installation information loaded into the storage circuits.

9. A detector as in claim 8 where the environmental condition sensor comprises at least one of a glassbreak sensor, a position sensor, and motion sensor.

10. A method comprising:
    providing an environmental condition detector;
    control circuits of the environmental condition detector setting an installation flag data bit when first placed in test mode and obtaining and storing real-time data on storage circuits of the environmental condition detector, the real-time data pertains to setup and validation steps performed on the environmental condition detector at a time of installation including at least range testing of the environmental condition detector; and
    subsequently retrieving the stored data from the storage circuits through a program, debug and test interface to determine if the setup and validation steps were performed properly.

11. A method as in claim 10 where obtaining and storing real-time data on storage circuits includes obtaining and storing event related data.

12. A method as in claim 11 where events corresponding to the event related data include at least one of glass breakage, motion of an object, and installation of the detector.

13. A method as in claim 11 where obtaining and storing real-time data on storage circuits includes providing glass breakage data, or motion data separately from the installation data.

14. A method as in claim 13 where the installation data includes at least one of test mode data and setup data.

15. A method as in claim 13 where the installation data is stored automatically.

* * * * *